(12) United States Patent
Noguchi et al.

(10) Patent No.: US 6,378,382 B1
(45) Date of Patent: Apr. 30, 2002

(54) DEVICE FOR MEASURING ROTATION ACCURACY AND DYNAMIC TORQUE FOR RADIAL ROLLING BEARING

(75) Inventors: Shoji Noguchi; Ryoma Endou, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/447,588

(22) Filed: Nov. 23, 1999

(30) Foreign Application Priority Data

Nov. 24, 1998 (JP) .......................................... 10-332562

(51) Int. Cl.[7] ................................................ G01L 3/07
(52) U.S. Cl. .................................. 73/862.29; 73/562.08
(58) Field of Search .......................... 73/862.29, 862.08

(56) References Cited

U.S. PATENT DOCUMENTS 5,412,998 A * 5/1995 Nakamoto et al. ...... 73/862.335

FOREIGN PATENT DOCUMENTS

JP 9-178613 7/1997

\* cited by examiner

Primary Examiner—Benjamin R. Fuller
Assistant Examiner—Andre Allen
(74) Attorney, Agent, or Firm—Crowell & Moring LLP

(57) ABSTRACT

A device is provided for measuring non-repetitive run-out and dynamic torque simultaneously for a radial rolling bearing, comprising a holder for holding one of the outer and inner races, a pushing member for pushing the holder in an axial direction without confining the holder in both of the radial and rotational directions, a drive shaft for rotatingly driving the other of the outer and inner races, a precision bearing device for rotatingly supporting the drive shaft, a displacement sensor for measuring radial displacement of the one of the outer and inner races, a wire having one end connected to a portion which rotates together with the one of the outer and inner races, and a torque sensor connected to the other end of the wire to measure dynamic torque applied to the one of the outer and inner races.

2 Claims, 6 Drawing Sheets

DEVICE FOR MEASURING ROTATION ACCURACY AND DYNAMIC TORQUE FOR RADIAL ROLLING BEARING

TITLE OF THE INVENTION

Device for Measuring Rotation Accuracy and Dynamic Torque for Radial Rolling Bearing

FIELD OF THE INVENTION

The present invention relates to a device for measuring rotation accuracy and dynamic torque for a radial rolling bearing, specifically a device which is used to measure the rotation accuracy and dynamic torque of the radial rolling bearings installed in various kinds of rotation supports in order to make it possible to make a higher performance rotation support unit.

BACKGROUND OF THE INVENTION

In radial rolling bearings such as ball bearings, roller bearings, tapered roller bearings or the like, is known that differences occur in the shapes and dimensions of the rolling bodies such as the balls, roller, tapered rollers, etc., as well as difference in the shapes of the raceways in the inner and outer races, and that non-repetitive minute displacements in the radial direction, called 'Non-repetitive Run-out' (NRRO), occur each rotation. In the case of radial bearings that are installed in the rotation supports of high-precision devices such as hard disk drives (HDD), these minute displacements have a large effect on performance.

Therefore, it is very important that rotation accuracy of a radial rolling bearing is measured, and that if it is found that this kind of NRRO exists, measures be taken to remove it in order to improve the performance of the device.

A prior art device, as disclosed in Japanese Patent Publication No. Toku Kai Hei 9-178613, for measuring the rotation accuracy of a radial rolling bearing for this objective has been known. FIGS. 6 thru 8 show the prior art device that is described in this disclosure.

What is measured by this device is a radial rolling bearing 1, specifically deep-groove type ball bearing, which comprises an inner race 2, outer race 3 and multiple rolling bodies, specifically balls 4 provided between the inner race 2 and outer race 3.

With the device for measuring rotation accuracy for a radial rolling bearing shown in FIGS. 6 thru 8, the NRRO of this radial rolling bearing 1 is obtained by measuring the displacement in the radial direction of the outer race 3 of the radial rolling bearing 1.

This kind of rotation accuracy measurement device for radial rolling bearing includes a frame 8 that comprises a top plate 5 and bottom plate 6 that connected by support posts 7 such that the top plate 5 and bottom plate 6 are parallel with each other. Of these, fastened to and supported by the bottom plate 6 is a drive unit 9 which drives and rotates the inner race 2 in the state where it is predeterminedly positioned in the radial direction.

This drive unit 9 comprises a spindle shaft 10 that is driven and rotated by a motor that is located in the vertical direction (not shown in the drawing), and a precision bearing device 11 such as a hydrostatic gas bearing which supports the spindle shaft 10 with high accuracy such that it can rotate freely and such that there is as little displacement in the radial direction as possible.

The inner race 2 fits without play around the top end of the spindle shaft 10 of this drive device 9.

On the other hand, fastened to and supported by the top plate 5 is a support device 12 by which the outer race 3 is supported, such that it does not rotate and such that it displaces freely in the radial direction, as well as that an axial load is applied to the outer race 3. The support device 12 has a cylindrical member 14 that is fastened to the section of retaining hole 13 formed in the center of the top plate 5. In order to apply this axial load, a through hole 16 is formed in the bottom section 15 of the cylindrical member 14, and a push rod 17 is inserted through this through hole 16 and has a rimmed section 18 attached on the top end thereof.

Moreover, the support device 12 has a push rod 17, a receiving plate 19 that is fitted inside the cylindrical member 14 such that it raises and lowers freely, and a compression spring 20 that is located between the top surface of the rimmed section 18 and the bottom surface of the receiving plate 19, and this spring 20 pushes the push rod 17 downward. Also, the support device 12 has a cover plate 21 that attaches to the opening on the top end of the cylindrical member 14, and a screw hole (not shown in the figure) is formed in the center of the cover plate 21, and an adjustment screw 22 is screwed into this screw hole. The axial load that is applied to the push rod 17 by the compression spring 20 can be freely adjusted by adjusting the position of the receiving plate 19 up or down by turning the adjustment screw 22.

Moreover, the support device 12 has a holder 23 formed on the bottom end thereof, and a circular concave hole 24 is formed on the bottom surface of the holder 23 to hold the outer race 3, so that it does not move and, so that there is no elastic deformation. On the top surface of the holder 23, there is a protruding section 25 that is formed such that it extends in a radial direction. Furthermore, the support device 12 has an anchoring plate 26 that is fastened on the bottom end of the push rod 17, and there is a protruding section 27 that is formed on the bottom surface of the anchoring plate 26 such that it extends in a radial direction.

A porous material 28, made from a sintered material or the like, is placed and held between the top surface of the holder 23 and the bottom surface of the anchoring plate 26, and to form a hydrostatic gas bearing 29 that allows displacement in the radial direction.

In other words, on the bottom surface of the porous material 28 there is a concave groove 30 whose width is a little larger than the width of the protruding section 25 on the top surface of the holder 23, while on the top surface of the porous material 28, there is a concave groove 31 whose width is a little larger than the width of the protruding section 27 on the bottom surface of the anchoring plate 26. Both of these grooves 30, 31 run in a radial direction in the porous material 28 such that they run perpendicular to each other.

There is an air-supply hole 32 formed in a part of the porous material 28 to allow for compressed air to be fed freely inside the porous material 28. When the rotation accuracy measurement device for radial rolling bearing is operating, the compressed air that is fed to the inside of the porous material 28 from this air-supply hole 32 is blown onto the surfaces of the protruding sections 25, 27 from the concave grooves 30, 31 and forms a compressed air layer between the inner surfaces of the concave grooves 30, 31 and the surfaces of the protruding sections 25, 27.

In the same way, the compressed air is blown onto the bottom surface of the anchoring plate 26 from the top of the porous material 28, and onto the top surface of the holder 23 from the bottom surface of the porous material 28 to form a compressed air layer between these pairs of top and bottom surfaces.

In this state, the holder 23 is supported such that it does not come in contact with the bottom of the anchoring plate 26, that it does not rotate with respect to the anchoring plate 26, and that it displaces freely in the radial direction by a very weak force. The axial load due to the compression spring 20 is freely transmitted by way of these compressed air layers.

Furthermore, a non-contact type displacement sensor 33 is located on part of the frame 8 between the bottom surface of the top plate 5 and the top surface of the bottom plate 6 such that it faces the outer surface of the holder 23 that holds the outer race 3.

A measurement device, such as a laser Doppler vibration meter, which can measure the minute displacement of the outer surface of the holder 23 that holds the measured object, namely the outer race 3, without coming in contact with it, is used for this displacement sensor 33. In the example shown in the figure, only one displacement sensor 33 of this kind is used, however it is also possible to use two that are located 90 degrees from each other in the circumferential direction.

When measuring the NRRO of a radial rolling bearing with the conventional rotation accuracy measurement device for a radial rolling bearing, constructed as described above, the inner race 2 fastened to the top end of the spindle 10 of the drive unit 9 is rotated by rotating the spindle 10.

Moreover, an axial load is applied to the outer race 3 by the compression spring 20 that is installed inside the support device 12, and displacement in the radial direction of the outer race 3 is measured by the displacement sensor 33.

Since the outer race 3 is supported by the hydrostatic gas bearing that is installed inside the support device 12 so that there is smooth displacement in the radial direction, the outer race 3 displaces in the radial direction just by the amount of the distortion of the rolling bodies 4 when a force in the radial direction is applied to the outer race 3 due to the aforementioned distortion. In other words, since the resistance that acts in the direction that opposes displacement of the outer race 3 in the radial direction is very small, the aforementioned distortion is nearly the same as the displacement in the radial direction of the outer race 3. Also, this displacement is detected by the displacement sensor 33.

In the case of the conventional construction shown in FIGS. 6 thru 8, it is possible to accurately measure the NRRO of the radial rolling bearing 1, however, it is not possible to measure the dynamic torque of this radial rolling bearing 1. For example, in the case of a radial rolling bearing, specifically small-diameter ball bearing or miniature bearing, that is assembled in a spindle motor for a magnetic disk drive such as a hard disk drive (HDD), in order to eliminate read and write errors, it is necessary to keep the NRRO at a minimum, as well as lower the dynamic torque in order to reduce power consumption.

Particularly, in the process of this invention described later, it was found that there is a relationship between the NRRO and dynamic torque. Conventionally, the NRRO and dynamic torque were thought to be completely separate, and that they changed independent of each other. However, from experiments through the process developing this invention, it was found that the state of the dynamic torque and increases or decreases of the NRRO are related with each other. Therefore, a device that accurately measures the NRRO of the radial rolling bearing, while at the same time measures the dynamic torque, is desired.

However in the device of the prior art shown in FIGS. 6 thru 8, it was not possible to simultaneously and accurately measure the NRRO and dynamic torque.

SUMMARY OF THE INVENTION

An object of the present invention is to provide a device for measuring rotation accuracy and dynamic torque for a radial rolling bearing to make it possible to simultaneously and accurately measure the NRRO and dynamic torque of the radial rolling bearing, and in so doing, make it possible to improve the performance of a precision radial rolling bearing assembled in a device such as a magnetic disk device.

DESCRIPTION OF THE PREFERRED EMBODIMENTS

Figure 1:
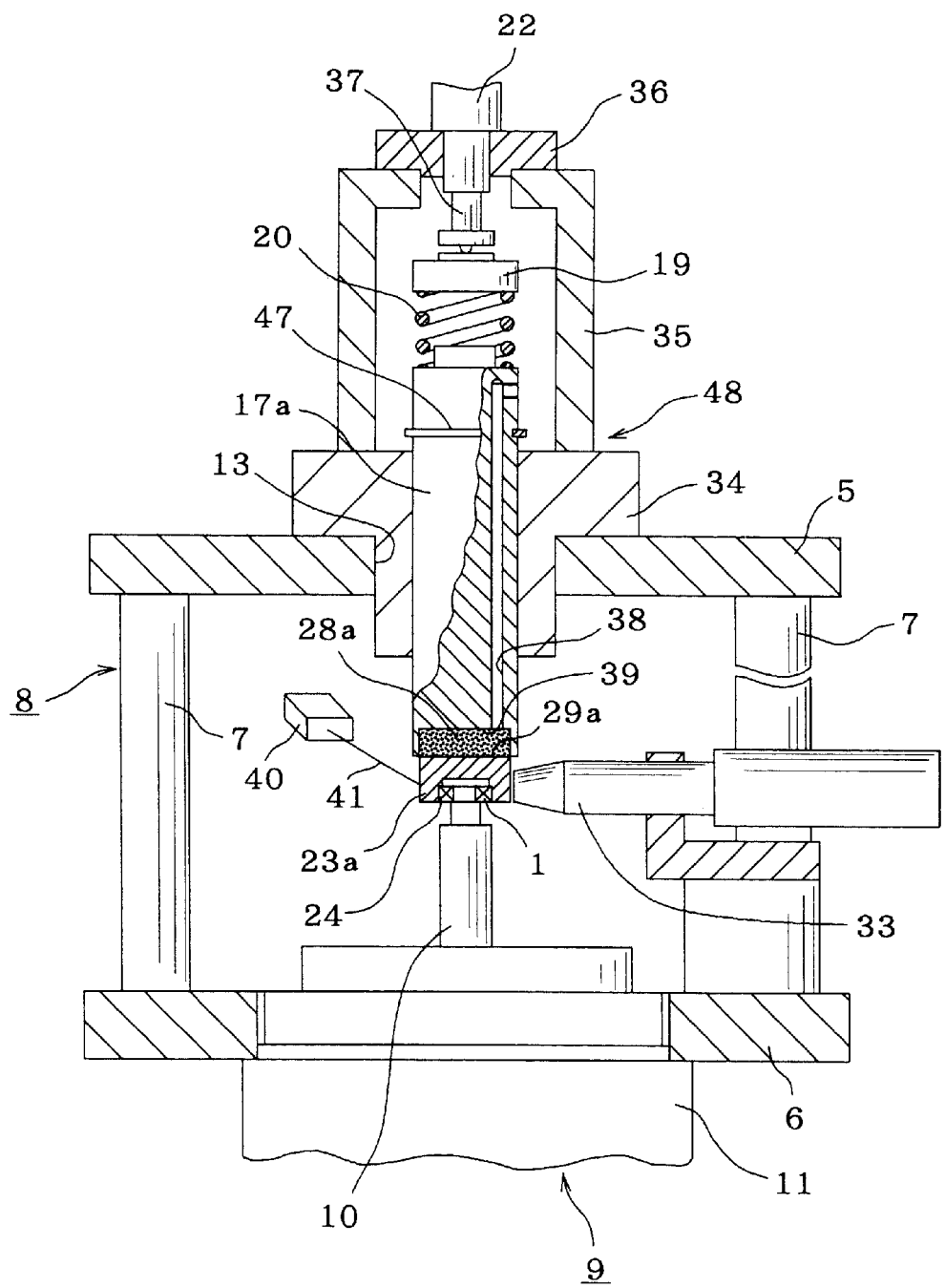
FIG. 1 is a partial vertical cross sectional view showing a first example of the embodiment of the present invention.
Figure 8:
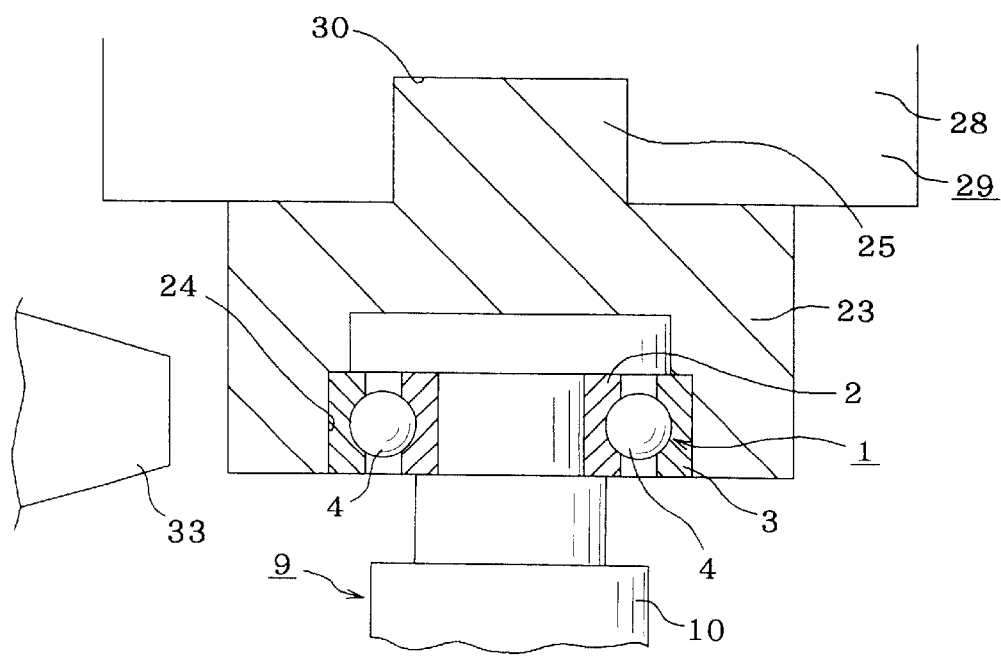
FIG. 8 is an enlarged view of the VIII section in FIG. 6.

FIG. 1 shows a first embodiment of the invention. The radial rolling bearing unit 1 to be measured comprises a first race or outer race 3 having an inner peripheral surface formed with an outer ring raceway, second race or inner race 2 having an outer peripheral surface formed with an inner ring raceway, and multiple rolling bodies, specifically balls 4 provided between the outer ring raceway of the inner race 2 and the outer ring raceway of the outer race 3 as shown in FIG. 8.

The device for measuring rotation accuracy and dynamic torque for the radial rolling bearing is similar to the device for measuring rotation accuracy and dynamic torque for a radial rolling bearing of the prior art described above in that it comprises a frame 8 that includes a top plate 5 and bottom plate 6 that are supported by support columns 7 such that they are parallel to each other.

Of these plates, fastened to and supported by the bottom plate 6 is a drive unit 9 which rotates and drives the second race, namely the inner race 2 (see FIG. 8), of the radial rolling bearing 1 to be measured in the state where it is predetermindly positioned in the radial direction.

The drive unit 9 comprises a drive shaft or spindle shaft 10, which is driven by a motor (not shown in the figure) that is located in the vertical direction, and a precision bearing 11, which supports the spindle shaft 10 such that it can rotate freely.

This precision bearing 11 supports the spindle shaft 10 highly accurately such that there is very little (practically none) displacement in the radial direction, and it is desirably a non-contact type bearing such as a hydrostatic gas bearing, magnetic bearing which can reduce such displacement minimum.

The inner race 2 is fitted without play around the top end of this spindle shaft 10. However, consideration is taken such that the inner race 2 does not deform elastically due to the outside fit.

On the other hand, there is a pushing unit 48 located on the top plate 5. This pushing unit 48 has a function that applies an axial load on the first race, namely the outer race 3 (see FIG. 8), of the radial rolling bearing 1 to apply a pre-load to the radial rolling bearing, and has a function that allows the outer race 3 to displace smoothly in the radial and rotation directions.

In order to realize the function for applying the axial load, a guide block 34 is fastened to the section of support hole 13 that is formed in the center of the top plate 5. In addition, a push rod 17a is inserted through the center hole of this guide block 34 such that it can be raised or lowered freely. Further, a receiving plate 19 is located above the guide block 34 such that it can be raised or lowered freely.

There is a compression spring 20 located between the top surface of the push rod 17a and the bottom surface of the receiving plate 19. The push rod 17a is pushed downward by a force that corresponds to the elastic force of this compression spring 20.

Moreover, there is a support plate 36 that is formed at the top of the support cylinder 35, and a straight spindle type adjustment screw 22 passes through the center of the support plate 36 and fastens to the top of the receiving plate 19. The vertical position of the receiving plate 19 is freely adjusted by turning the knob (not shown in the figure) located on the top end of the adjustment screw 22 to raise or lower the spindle 37. The axial load that is applied to the push rod 17a by the compression spring 20 is also freely adjusted by turning the adjustment screw 22.

On the other hand, in order to realize the function for allowing smooth displacement of the outer race 3 in the radial and rotation direction, a holder 23a for holding the outer race 3 is located on the bottom end of the push rod 17a.

A circular concave hole 24 for holding the outer race 3 with clearance fit is formed on the bottom surface of the holder 23a, and the top surface of the holder 23a is a flat smooth surface. The reason that the outer race 3 is held inside this circular concave hole 24 with clearance fit, is that it is possible to prevent elastic deformation of the outer race 3 which would be caused by interference fit. In addition, the holder 23a and the outer race 3 are fitted together such that they move as a single member due to the friction force, that is caused by the axial load applied by the pushing unit 48 that acts between part of the bottom surface of the holder 23a and the surface on the top end of the outer race 3, and there is no play of the first race or outer race 3 inside the circular concave hole 24.

In order that the first race or outer race 3 and holder 23a can be handled as a single member, first race or outer race 3 and holder 23a can be adhered together (for example, by applying an adhesive between the outer peripheral surface of the outer race 3 and the inner peripheral surface of the circular concave hole 24).

Moreover, a supply-air duct 38 is formed inside the push rod 17a, and a porous material 28a made from a sintered material and formed in a circular plate shape is fitted inside the concave retaining hole 39 that is formed on the bottom end of the push rod 17a, and compressed air is freely fed to this porous material 28a by way of the supply-air duct 38.

In addition, a hydrostatic gas bearing 29a of the thrust-bearing type is constructed by placing the bottom surface of the porous material 28a adjacent to and facing the top surface of the holder 23a, and this controls the displacement in the axial direction of the holder 23a, but allows displacement in the radial and rotation direction of the holder 23a.

The compressed air that is fed through the supply-air duct 38 to the inside of the porous material 28a is blown out from the bottom surface of the porous material 28a onto the top surface of the holder 23a, to form a film of compressed air between these two surfaces. In this state, the holder 23a is supported by the lower side of the push rod 17a in a non-contact state, which allows for free displacement in the radial or rotation direction with respect to the push rod 17a by a very light force. Also, the axial load from the compression spring 20 is freely transmitted by way of the film of compressed air.

Also, there is a displacement sensor 33 located on part of the frame 8 between the top plate 5 and the upper surface of the bottom plate 6 in the part that faces the outer peripheral surface of the holder 23a that holds the first race or outer race 3 so as to find the displacement of the first race or outer race 3 in the radial direction. It is desirable that a non-contact type sensor such as capacitance type sensor, which will not come in contact with the outer peripheral surface of the holder 23a that holds the outer race 3 to be measured and that is capable of measuring very small displacement of the outer peripheral surface, be used for this displacement sensor 33. However, it is possible to use a contact type displacement sensor, such as an electronic micrometer or the like, if the measurement contact pressure is very small so that it does not affect the NRRO. In the example shown in the figures, one displacement sensor like this is used, however, it is also possible, as in the construction of the prior art described above, to use two sensors that are separated by 90 degrees in the circumferential direction, to find the displacement of the first race or outer race 3 in the radial direction at all angles and to accurately detect the maximum value of the NRRO. Moreover, if a laser Doppler interference type displacement sensor (Ono Instruments Co., Ltd., model LV-3300 or the like), that is capable of measurement in three directions, is used, it is possible to measure fluctuations in the radial direction, as well as in the axial direction.

Furthermore, part of the frame 8 supports a torque sensor 40 such as a load cell. Also, there is a very thin wire 41 that connects the detection section of the torque sensor 40 and the outer peripheral surface on part of the holder 23a. The dynamic torque that is applied to the holder 23a from the first race or outer race 3 can be freely measured by this torque sensor 40. In another words, the dynamic torque applied to the first race or outer race 3 is measured using the torque sensor 40 through the wire 41 having one end connected to a portion which rotates together with the first race or outer race 3.

When measuring the NRRO and dynamic torque of the radial bearing 1 with the rotation accuracy and dynamic torque measurement device for a radial rolling bearing of this invention, constructed as described above, the section race or inner race 2, which is fastened to the top end of the spindle shaft 10 of the drive unit 9, is rotated by rotating this spindle shaft 10.

Also, when an axial load is applied to the first race or outer race 3 by the compression spring 20 assembled in the pushing device 48, the displacement of the first race or outer race 3 in the radial direction is measured by the displacement sensor 11, and the dynamic torque that is applied to the holder 23a from the first race or outer race 3 is measured by the torque sensor 40. The holder 23a, which holds the first race or outer race 3, is supported by the hydrostatic gas bearing 29a located on the bottom end of the push rod 17a of the pushing device 48 such that it can move smoothly in the radial direction, therefore when a force is applied to the first race or outer race 3 in the radial direction due to distortion of the rolling bodies 7 (see FIG. 8), the first race or outer race 3 displaces in the radial direction just by the amount of the distortion. In other words, since the resistance that acts in the direction to prevent the first race or outer race 3 from displacing in the radial direction is very small, the aforementioned distortion nearly represent the displacement in the radial direction of the first race or outer race 3. This displacement is detected by the displacement sensor 11.

Moreover, when the second race or inner race 2 is rotated as mentioned above, the holder 23a, which holds the first race or outer race 3, tends to rotate around the second race or inner race 2 due to the rotation resistance (dynamic torque) of the radial rolling bearing 1. However, this holder 23a is prevented from rotating by the wire 41. Instead, the dynamic torque of the radial rolling bearing 1 is measured by the torque sensor 40 that is connected to the wire 41.

With the rotation accuracy and dynamic torque measurement device for a radial rolling bearing of this embodiment, the resistance against the rotation of the outer race 3 is produced only by the torque sensor 40, which is connected to the outer race 3 by the wire 41 and the holder 23a, so it is possible to accurately measure the dynamic torque. It is possible that the wire 41 can become a source of resistance to displacement in the radial direction of the holder 23a which holds the outer race 3, however, since the dynamic torque of the radial rolling bearing 1 is small, that the tensile force of the wire 41 is also small. Therefore, if a thin wire with low rigidity is used for this wire 41 and its length is maintained such that it does not affect the measurement value of the dynamic torque, then the resistance against displacement in the radial direction of the outer race 3 due to the existence of this wire 41 can be kept to a level where it can be ignored.

Figure 2A:
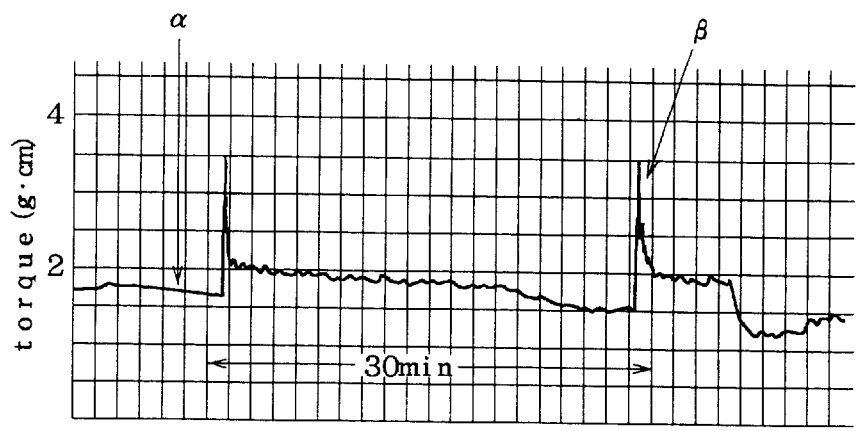
FIGS. 2(A) to 2(C) are a graph showing an example of the measurement results in the present invention.
Figure 2B:
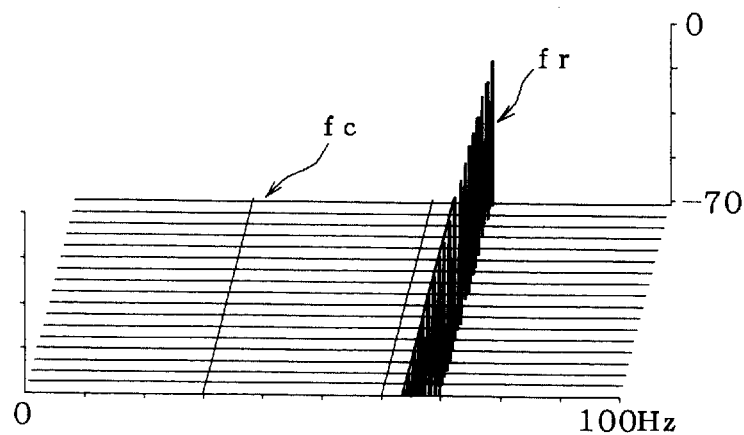
Figure 2C:
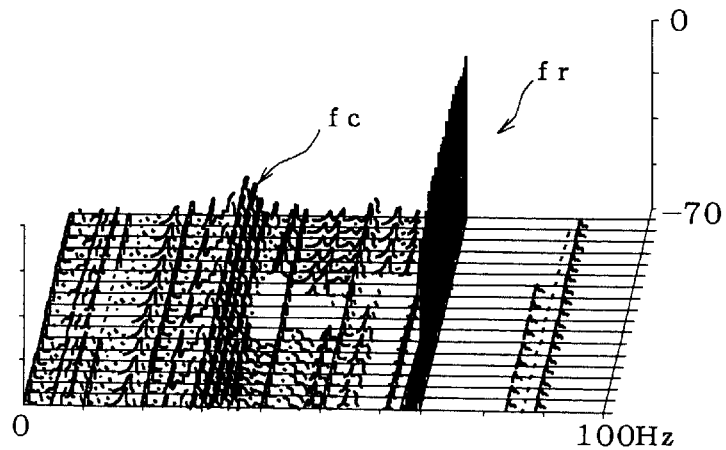

FIGS. 2(A) to 2(C) show one example of the measurement results of the dynamic torque and NRRO of a radial ball bearing using the rotation accuracy and dynamic torque measurement device for a radial rolling bearing of this invention. FIG. 2(A) shows the changing state of the dynamic torque of the radial ball bearing over time wherein an example of torque curve is contained for B6-95, number of inner ring rotation: 4200 rpm, NS7, FIG. 2(B) shows the results of the FFT (fast Fourier transform) and NRRO measurement results as shown by the arrow α in FIG. 2(A) when the dynamic torque is stable wherein the maximum NRRO value is from 25 nm to 30 nm, and FIG. 2(C) shows the FFT results and NRRO measurement results when the dynamic torque is changing as shown by the arrow β in FIG. 2(A) wherein the maximum NRRO value is from 70 nm to 90 nm.

As can be seen from FIGS. 2(A) to 2(C), there is a relationship between the NRRO and dynamic torque. From this, it was found that in research for improving the performance of a radial rolling bearing, it is effective to measure the NRRO and dynamic torque simultaneously checking the relationship therebetween. The rotation accuracy and dynamic torque measurement device for a radial rolling bearing of this invention satisfies the above demands by measuring both the NRRO and dynamic torque checking the relationship therebetween.

Figure 3:
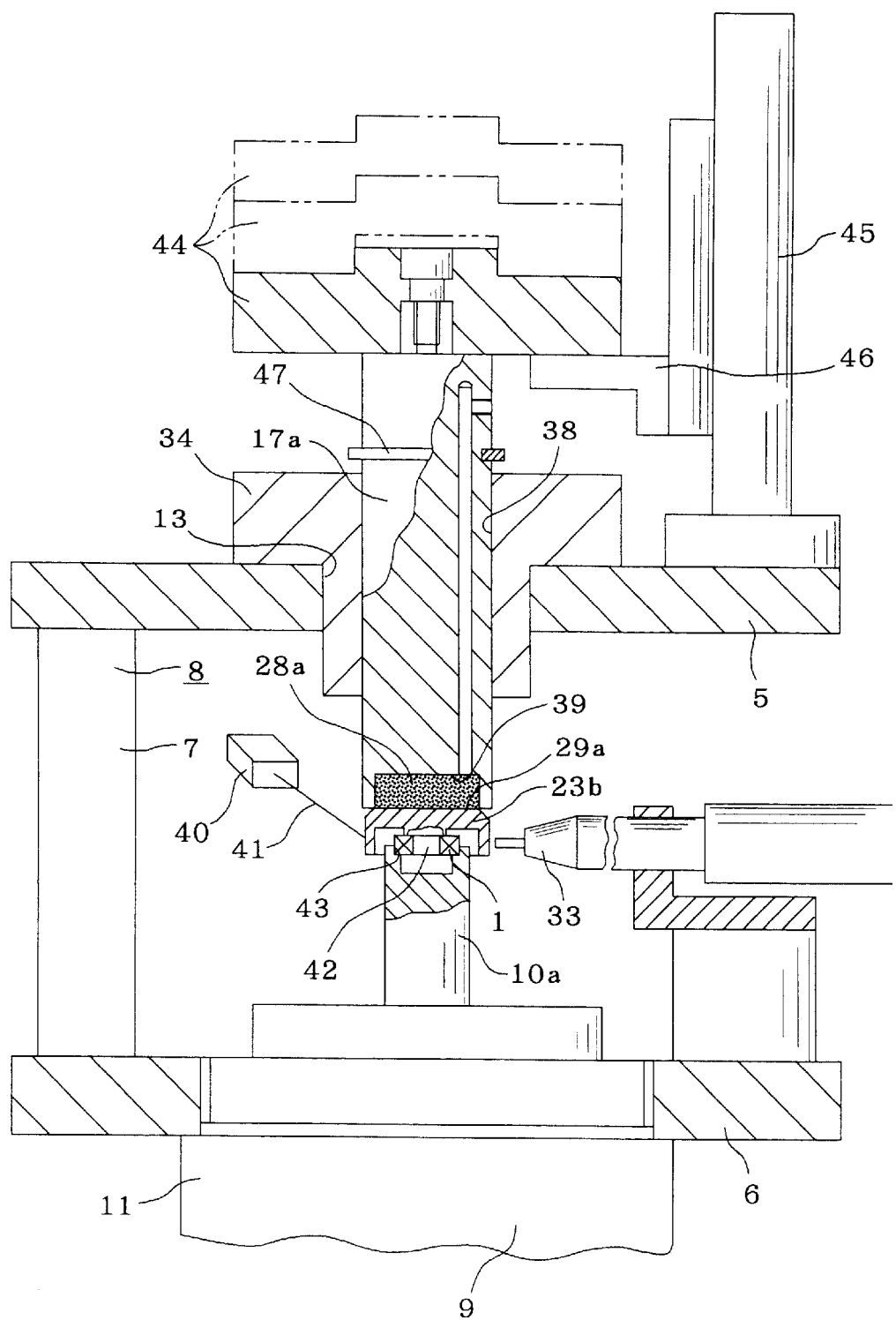
FIG. 3 is a partial vertical cross sectional view showing a second example of the embodiment of the present invention.

Next, FIG. 3 shows a second embodiment of the invention. In the case of the first embodiment described above, the construction complied to Japanese Industrial Standard (JIS) B1515 (1988) such that the inner race 2 is rotated while the outer race 3 is not rotated. However, this embodiment is opposite in that the inner race 2 (see FIG. 8) is fitted with clearance fit around a support shaft 42 that is located in the center of the holder 23b, while the outer race 3 (see FIG. 8) is fitted with clearance fit on the inside of a concave support hole 43 that is formed on the top end of a spindle shaft 10a.

It should be noted that in this embodiment, the inner race 2 is the first race, while the outer race 3 is the second race, which is opposite to the first embodiment. When measuring the NRRO and dynamic torque, the second race or outer race 3 is rotated, and the displacement and dynamic torque in the radial direction of the holder 23b, which holds the first race or inner race 2, is measured.

Furthermore, in this embodiment, in order that an axial load is applied to the radial rolling bearing 1, a weight 44 is fastened to and supported on the top end of the push rod 17a. When measuring the NRRO and dynamic torque, corresponding to the weight of the weight 44 a pre-load is applied to radial rolling bearing. When not measuring, the weight 44, push rod 17a and porous material 28a are moved upward by a lifting arm 46 of a lifter 45 with a built-in actuator such as an air cylinder. In this embodiment, it is easier to install or remove the test specimen or radial rolling bearing 1 than in the first embodiment, and the measurement work is more efficient. Of course, this kind of construction for improving the efficiency of the measurement work can also be applied to construction such as in the first embodiment, where measurement is performed while rotating the first race or inner race 2.

A stop ring 47 is attached around the middle section of the push rod 17a, so that it is prevented that when performing the installation or disassembly, the push rod 17a drops too far to damage the porous material 28a.

Figure 4:
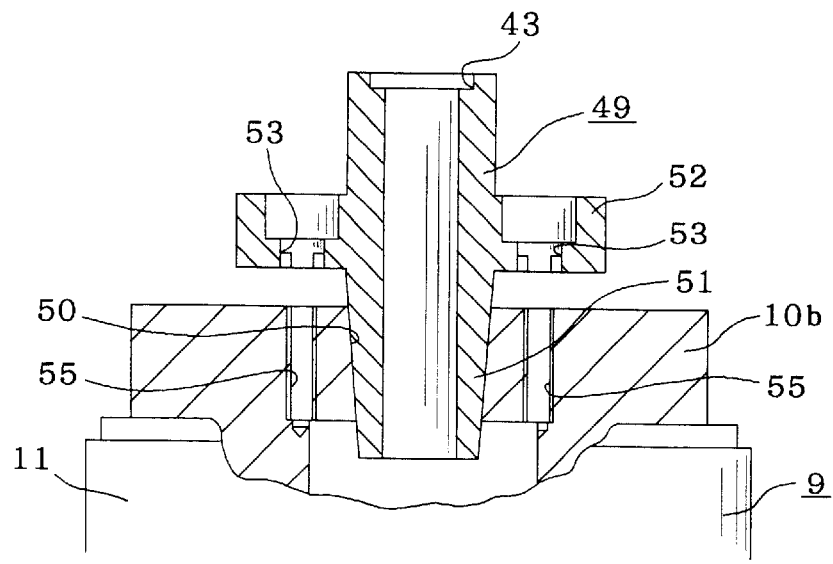
FIG. 4 is a partial vertical cross sectional view showing an upper end of the spindle shaft in a second example of the embodiment of the present invention.
Figure 5:
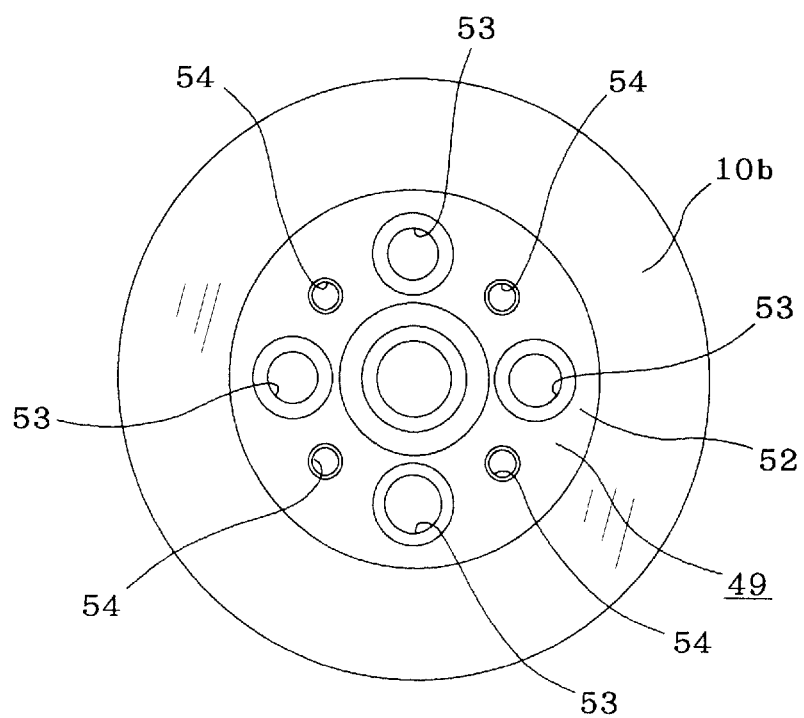
FIG. 5 is a view from above with reference to the FIG. 4.
Figure 6:
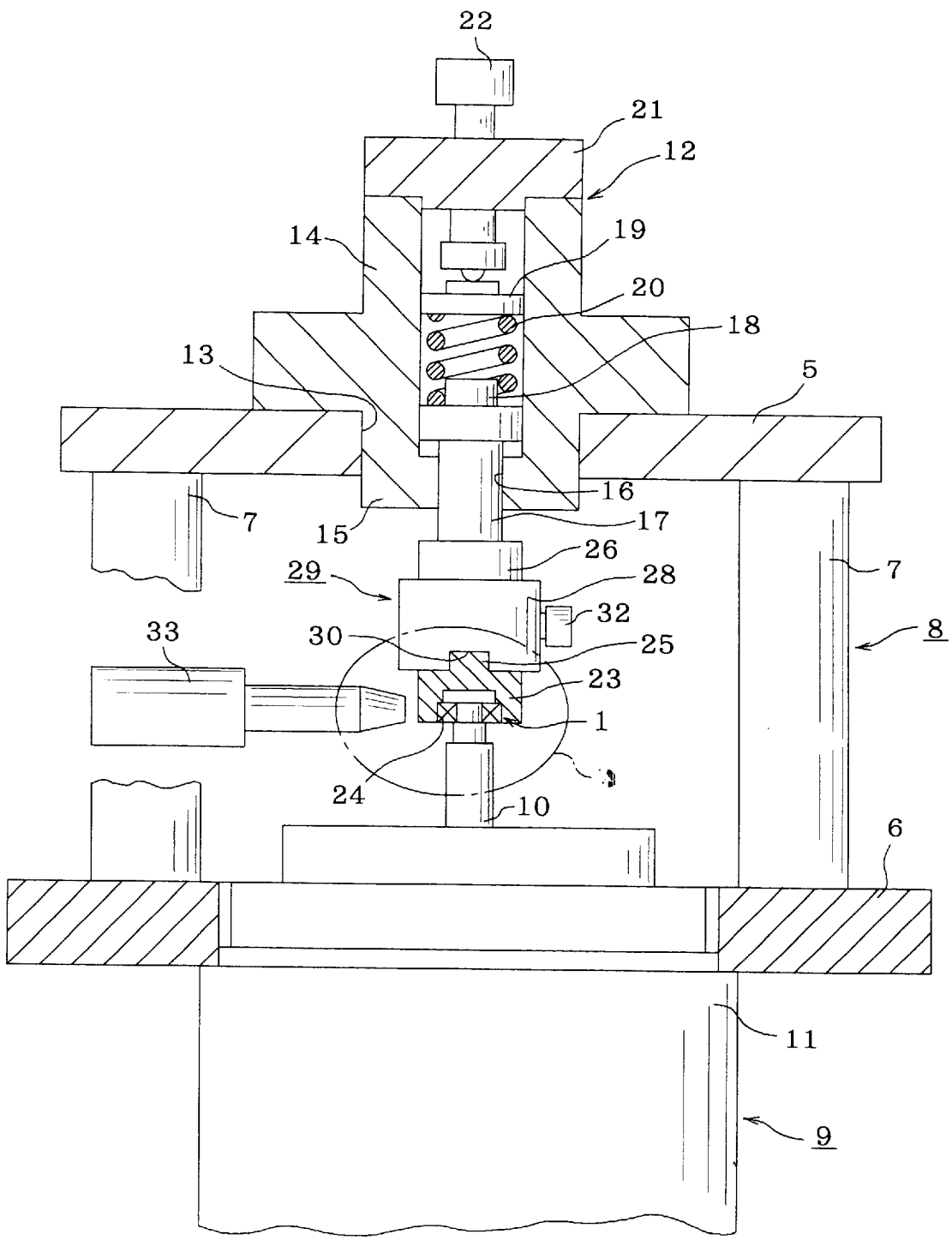
FIG. 6 is a partly cut-away, partial vertical cross sectionasl view showing an example of the conventional devices.
Figure 7:
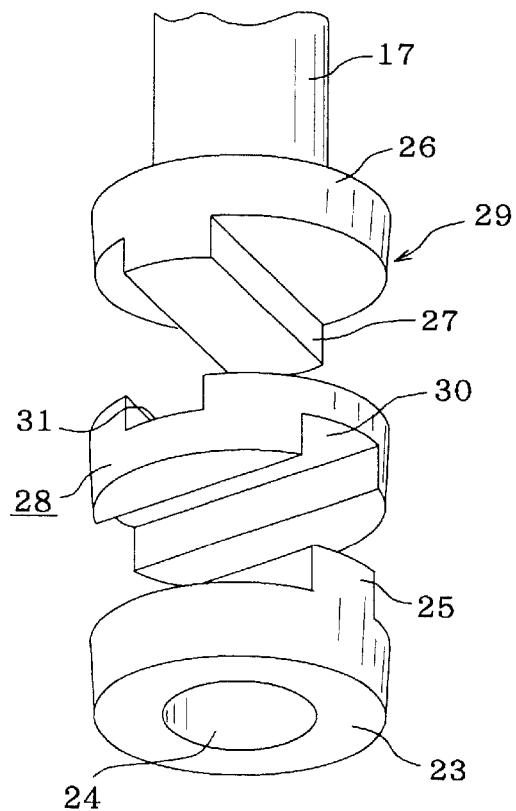
FIG. 7 is an exploded perspective view of part of a support device section.

Next, FIGS. 4 and 5 show a third embodiment of the invention. This embodiment reduces the amount of work and time required for performing preparation for measurement, and makes it possible to improve efficiency when measuring the NRRO and dynamic torque of many kinds of radial rolling bearings.

In the case of the first embodiment, shown in FIG. 1, or the second embodiment, shown in FIG. 3, the part on the top end of the spindle shaft 10, 10a that the inner race 2 fits around or the part that fits around the outer race 3, is fixed, and no special consideration is taken as to whether the diameter of the inner race 2 or the outer race 3 is variant. In the case that the rotation accuracy and dynamic torque are measured with the same measurement device for radial rolling bearings 1 with different model numbers and where the diameter of the inner race 2 or the outer race 3 differ, the diameter of the part at the top end of the spindle shafts 10, 10a that the inner race 2 fits around or that fits around the outer race 3 must be changed.

Therefore, an exchangeable head is located on the top end of the spindle shafts 10, 10a, and when measuring radial rolling bearings 1 with different model numbers, this head can be exchanged. However, if the head is attached to the spindle shaft 10, 10a by simply screwing it on, then the work of lining up the center axis of the head with the center axis of the spindle 10, 10a becomes troublesome. In other words, if the center axis of the head is not lined up with the center axis of the spindle shaft 10, 10a, the radial rolling bearing 1 may wobble when performing measurement work.

This wobbling is synchronous with the rotation, so there is no error in the measurement value of the NRRO, however, problems arise in the relationship with the measurement limits of the displacement sensor 33. That is, since the measurement limit of the displacement sensor 33 for measuring accurate NRRO is very narrow, it is best if the amount that the center axis of the head is not displaced from the center axis of the spindle shaft 10, 10a is kept within a range of ±1 μm. If the head is constructed such that it is connected to the spindle shaft 10, 10*a* by simply screwing on as described above, the work of keeping the shift within the aforementioned range is troublesome and requires much skill, so it is very difficult to improve the efficiency when measuring radial rolling bearings 1 with different model numbers.

Therefore, in this embodiment, a second holder 49 for supporting the race on the drive side (outer race 3 in the example in the figure) through clearance fit without play on the top end of the spindle shaft 10*b* is connected coaxially with a tapered joint. Therefore, in the center on the top surface of the spindle shaft 10*b*, a receiving hold 50 is formed and inclined such that its inner diameter increases in the direction toward the opening on the top end thereof.

The center axis of this receiving hole 50 and the center of rotation of the spindle shaft 10*b* match precisely. Also, on the lower half of the second holder 49, a conical section 51 is formed and inclined such that its outer diameter becomes smaller in the direction toward the bottom end thereof. The angle of inclination of the outer peripheral surface of this conical section 51 and the angle of inclination of the inner peripheral surface of the receiving hole 50 match precisely.

Moreover, on the top end of the second holder 49, a concave support section 43 that fits around and supports the driven race is formed. If the inner race 2 (see FIG. 8) is the driven race, a circular protruding column section that fit inside the inner race 2 with clearance fit is formed instead of the concave support section 43 illustrated. The center axis of this concave support section 43 (or circular protruding column section) matches precisely with the center axis of the conical section.

Furthermore, a connection flange 52 is formed around the outer peripheral surface in the middle of the second holder 49, and stepped through holes 53 for inserting the connection screws (not shown) therethrough, and screw holes 54 are formed in this connection flange 52 such that they alternate in the circumferential direction (there are four holes respectively in the example in the figure). Another screw holes 55 are formed in the upper end surface of the spindle shaft 10*b* in a position in alignment with the through holes 53.

In this embodiment, constructed as described above, by inserting the conical section 51 into the receiving hole 50, it is possible to precisely and easily match the center axis of the concave support 43 with the center of rotation of the spindle shaft 10*b*. In this state, the connection screws (not shown in the figure) are inserted through the holes 53, and these connection screws are screwed into the screw holes 55 that are formed on the surface on the top end of the spindle shaft 10*b*, making it possible to prevent the connection of the conical section 51 and the receiving hole 50 from coming loose during the measurement work.

When removing the second holder 49, which was connected up until then to the top end of the spindle shaft 10*b*, in order to change the model number of the radial rolling bearing whose rotation accuracy and dynamic torque are to be measured, removal screws (not shown in the figure) are screwed from the top downward into the screw holes 54 formed on the connection flange 52, and the bottom end of these removal screws come into contact with the surface on the top end of the spindle shaft 10*b*. From this state, if these removal screws are further rotated in the downward direction, it is possible to easily remove the conical section 51 from the receiving hole 50. In this way, the construction of this embodiment makes it possible to efficiently measure the rotation accuracy and dynamic torque in several kinds of radial rolling bearings with differing model numbers.

When measuring the NRRO and dynamic torque of a radial rolling bearing with the rotation accuracy and dynamic torque measurement device for a radial rolling bearing of this invention that is constructed as described above, an axial load is applied to the first race (outer ring in FIGS. 1 and 2, inner ring in FIG. 3) by a pressure means while the second race (inner race in FIGS. 1 and 2, outer ring in FIG. 3) is rotated by the drive shaft, and the displacement in the radial direction of the first race is measured by a displacement sensor, as well as the torque which tries to rotate the first race is measured by a torque sensor.

The holder which holds that the first race is not bound in either the radial direction or rotation direction, so when a force is applied to the first race in the radial direction due to the distortion of the rolling bodies, the first race is displaced in the radial direction by just the amount of the aforementioned distortion, and that displacement is measured by the displacement sensor. From the amount of displacement in the radial direction of the first race, which is measured by the displacement sensor, it is possible to find the NRRO of the radial rolling bearing. At the same time, since the first race tries to rotate due to rotation resistance (dynamic torque) of the radial rolling bearing, a torque sensor measures the torque applied to the first race. From the torque measured by the torque sensor, it is possible to find the dynamic torque of the radial rolling bearing.

In the device for measuring rotation accuracy and dynamic torque for a radial rolling bearing of this invention, since the resistance that acts against the displacement in the radial direction of the first race is kept to a minimum (nearly zero), it is possible to accurately find the value for NRRO. In the same way, since the resistance against the rotation of the first race is produced only by the sensor that is connected to the first race by way of a wire, it is possible to accurately measure the dynamic torque.

The wire resists against the displacement in the radial direction of the first race, however, since the dynamic torque of the radial rolling bearing is small, and since the tensile force of the wire is also small, by using a very fine wire with low rigidity for this wire, and by maintaining its length, it is possible to keep the resistance against the displacement in the radial direction of the first race due to the existence of the wire to a level where it can be ignored.

The device for measuring rotation accuracy and dynamic torque for a radial rolling bearing of this invention is constructed and functions as described above, making it possible to relate and accurately measure the NRRO and dynamic torque of various kinds of radial rolling bearings. Moreover, it makes it possible to improve the reliability of data used in development for the purpose of reducing the NRRO and dynamic torque of a radial rolling bearing, and contributes to improved performance of radial rolling bearings and of various devices in which radial rolling bearings are installed.

What is claimed is:

1. A device for measuring rotation accuracy and dynamic force of a radial rolling bearing comprising an outer race having an inner peripheral surface formed with an outer ring raceway, an inner race having an outer peripheral surface formed with an inner ring raceway, a plurality of rolling bodies provided between the outer ring raceway and the inner ring raceway, the device comprising a holder for holding one of the outer and inner races, a pushing member pushing the holder in an axial direction, a drive shaft for rotatingly driving the other one of the outer and inner races, a precision bearing device rotatingly supporting the drive shaft, a displacement sensor for measuring radial displacement of the one of the outer and inner races, a wire having one end connected to a portion of the holder which rotates together with one of the outer and inner races, and a torque sensor connected to the other end of the wire to measure dynamic torque applied to the one of the outer and inner races, wherein the pushing member does not confine the holder in either a radial or a rotational direction when pushing the holder.

2. The device of claim 1, wherein the rotation accuracy is non-repetitive run-out.

* * * * *